(12) United States Patent
Tsoumas et al.

(10) Patent No.: US 12,323,073 B2
(45) Date of Patent: Jun. 3, 2025

(54) METHOD FOR OPERATING A POWER ELECTRONIC CONVERTER DEVICE WITH FLOATING CELLS

(71) Applicant: ABB Schweiz AG, Baden (CH)

(72) Inventors: Ioannis Tsoumas, Zürich (CH); Tobias Geyer, Ennetbaden (CH); Mario Schweizer, Rütihof (CH); Eduardo Rohr, Camberwell (AU); Frederick Kieferndorf, Baden (CH); Wim Van-der-Merwe, Ennetbaden (CH); Manuel Vetterli, Basel (CH); Christian Meier, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 434 days.

(21) Appl. No.: 17/789,586

(22) PCT Filed: Dec. 17, 2020

(86) PCT No.: PCT/EP2020/086775
§ 371 (c)(1),
(2) Date: Jun. 28, 2022

(87) PCT Pub. No.: WO2021/136677
PCT Pub. Date: Jul. 8, 2021

(65) Prior Publication Data
US 2023/0042964 A1    Feb. 9, 2023

(30) Foreign Application Priority Data
Dec. 31, 2019    (EP) .................................... 19220176

(51) Int. Cl.
*H02M 7/487*    (2007.01)
*H02M 1/12*    (2006.01)
(Continued)

(52) U.S. Cl.
CPC ............. *H02M 7/487* (2013.01); *H02M 1/12* (2013.01); *H02M 1/15* (2013.01); *H02M 7/49* (2013.01);
(Continued)

(58) Field of Classification Search
CPC .......... H02M 7/487; H02M 1/12; H02M 1/15; H02M 7/49; H02M 7/5395; H02M 1/0067; H02M 1/0095
See application file for complete search history.

(56) References Cited

U.S. PATENT DOCUMENTS 5,805,437 A * 9/1998 Gruning ................ H02M 7/487
363/43
6,009,002 A * 12/1999 Steimer ................ H02M 7/483
363/40
(Continued)

FOREIGN PATENT DOCUMENTS

CN    102282750 A    12/2011
CN    108418219 A    8/2018
(Continued)

OTHER PUBLICATIONS

International Search Report and written opinion for International Application No. PCT/EP2020/086775, Feb. 19, 2021, 11 pages.
(Continued)

*Primary Examiner* — Yusef A Ahmed
(74) *Attorney, Agent, or Firm* — McCarter & English, LLP; Michael M. Gnibus (57) ABSTRACT

Described herein is a method of operating a power electronic converter device for an electrical power conversion system. The power electronic converter device includes a converter circuit including an input side, an output side, a first converter, and at least one second converter. The second converter includes at least one floating cell with a DC interme-
(Continued)

diate circuit and semiconductor devices. The method includes: switching the semiconductor devices of the floating cell at switching instants determined with optimized pulse patterns or carrier-based pulse width modulation; determining a fundamental voltage component for the floating cell; and generating the fundamental voltage component in the actual voltage of the floating cell by modifying the switching instants, such that a voltage $V_{C\_AF}$ of the DC intermediate circuit is lying in a given reference voltage range for balancing the DC intermediate circuit of the floating cell.

13 Claims, 4 Drawing Sheets

(51) Int. Cl.
  H02M 1/15 (2006.01)
  H02M 7/49 (2007.01)
  H02M 7/5395 (2006.01)
  H02M 1/00 (2006.01)

(52) U.S. Cl.
  CPC ........ *H02M 7/5395* (2013.01); *H02M 1/0067* (2021.05); *H02M 1/0095* (2021.05)

(56) References Cited

U.S. PATENT DOCUMENTS

| | | | | |
|---|---|---|---|---|
| 6,621,719 | B2* | 9/2003 | Steimer | H02M 7/49 363/43 |
| 7,825,540 | B2* | 11/2010 | Ogusa | H02M 1/0095 307/54 |
| 2003/0026111 | A1* | 2/2003 | Steimer | H02M 7/49 363/16 |
| 2006/0152085 | A1* | 7/2006 | Flett | H02M 7/003 307/75 |
| 2008/0304296 | A1* | 12/2008 | NadimpalliRaju | H02M 1/14 363/39 |
| 2012/0068756 | A1* | 3/2012 | Aiello | H02M 1/0095 327/333 |
| 2012/0092915 | A1* | 4/2012 | Okuda | H02M 7/487 363/132 |
| 2013/0088905 | A1 | 4/2013 | Lee et al. | |
| 2018/0309383 | A1* | 10/2018 | Wang | H02M 7/5387 |
| 2019/0190397 | A1* | 6/2019 | Van-Der-Maerwen | H02M 7/487 |
| 2020/0350836 | A1* | 11/2020 | Geske | H02M 7/4835 |
| 2020/0350847 | A1* | 11/2020 | Geyer | H02P 27/12 |
| 2021/0067057 | A1* | 3/2021 | Abarzadeh | H02M 7/4837 |
| 2021/0119442 | A1* | 4/2021 | Pettersson | H02M 1/0095 |
| 2022/0216803 | A1* | 7/2022 | Schweizer | H02M 1/007 |
| 2023/0010298 | A1* | 1/2023 | Schweizer | H02J 3/46 |
| 2023/0052562 | A1* | 2/2023 | Burkart | H02M 1/12 |
| 2023/0223886 | A1* | 7/2023 | Abarzadeh | H02M 7/5395 318/504 |
| 2024/0204650 | A1* | 6/2024 | Tsoumas | H02J 3/36 |
| 2025/0007441 | A1* | 1/2025 | Abarzadeh | H02M 7/487 |

FOREIGN PATENT DOCUMENTS

| | | |
|---|---|---|
| DE | 19615855 A1 | 10/1997 |
| EP | 0802617 A2 | 10/1997 |
| EP | 0884831 A2 | 12/1998 |
| EP | 2403131 A2 | 1/2012 |
| EP | 1253706 B1 | 8/2013 |
| EP | 3142236 A1 | 3/2017 |
| JP | 2013-158103 A | 8/2013 |
| RU | 2269196 C1 | 1/2006 |
| WO | 2018029303 A1 | 2/2018 |
| WO | 2018172329 A1 | 9/2018 |

OTHER PUBLICATIONS

S. Pulikanti, V. Agelidis, Control of Neutral Point and Flying Capacitor Voltages in Five-Level SHE-PWM Controlled ANPC Converter, 2009 IEEE Conference on Industrial Electronics and Applications, May 2009.
C. Silva, S. Kouro, J. Soto, and P. Lezana, Control of an hybrid multilevel inverter for current waveform improvement, 2008 IEEE International Symposium on Industrial Electronics, Jun. 2008.
C. Silva, L. Cordova, P. Lezana, L. Empringham, Implementation and Control of a Hybrid Multilevel Converter With Floating DC Links for Current Waveform Improvement, IEEE Transactions on Industrial Electronics, vol. 58, No. 6, 2011, pp. 2304-2312.
M. Veenstra, Investigation and control of a hybrid asymmetric multi-level inverter for medium voltage applications, Ph.D. Thesis, École Polytechnique Fédérale Lausanne, 2003.
M. Veenstra and A. Rufer, Control of a hybrid asymmetric multi-level inverter for competitive medium-voltage industrial drives, in IEEE Transactions on Industry Applications, vol. 41, No. 2, pp. 655-664, Mar.-Apr. 2005.
Dierk Schröder et al: "Selbstgeführte Wechselrichter mit eingeprägter Spannung" In: "Leistungselektronische Schaltungen ADD. Funktion, Auslegung und Anwendung", Jan. 31, 2019, Springer, pp. 604-724, with machine translation to English.
Chinese Office Action for Application No. 202080095720.4, dated Mar. 18, 2025, 11 pages.

\* cited by examiner

METHOD FOR OPERATING A POWER ELECTRONIC CONVERTER DEVICE WITH FLOATING CELLS

CROSS-REFERENCE TO RELATED APPLICATIONS

This application is a National Stage Entry of International Patent Application No. PCT/EP2020/086775, filed Dec. 17, 2020, and titled "METHOD FOR OPERATING A POWER ELECTRONIC CONVERTER DEVICE WITH FLOATING CELLS", which claims priority to European Patent Application No. 19220176.2, filed Dec. 31, 2019, and titled "METHOD FOR OPERATING A POWER ELECTRONIC CONVERTER DEVICE WITH FLOATING CELLS", each of which are hereby incorporated by reference in their entirety.

BACKGROUND

The present disclosure relates to a method, a computer program and a computer-readable medium for operating a power electronic converter device. Furthermore, the present disclosure relates to a power electronic converter device.

Document EP 1 253 706 B1 shows an electrical power conversion system with a power electronic converter device including: (i) a converter circuit including an input side with input terminals, a three phase output side with output terminals, a first converter and three second converters, each of them connected in series with the first converter with respect to a respective phase, each of said second converters including a floating cell with a capacitive element in a DC intermediate circuit and semiconductor devices, and (ii) a control device for driving semiconductor devices of at least one of the converters via pulse-like signals. In detail the converter circuit consists of the first converter being a main converter and 3 auxiliary floating cells, one for each phase. In such a converter circuit the number of floating cells per phase is not fixed and more floating cells can be accommodated. The complete dc-to-ac conversion circuit therefore takes the form of a main power converter provided by the first converter, the auxiliary switching cells of the second converter, and passive filter circuits. The main converter is shown as a 3-level neutral point clamped converter using IGCTs but other topologies and semiconductor types are possible. By means of the floating cells a DC voltage can be added to or subtracted from a DC voltage of the first converter with the help of the semiconductor devices.

Each of documents RU 2 269 196 C1 and U.S. Pat. No. 7,825,540 B2 describes a quite similar electrical power conversion system with a power electronic converter device.

U.S. Pat. No. 6,009,002 A describes a power electronics circuit with an NPC converter and floating cells connected to the AC outputs of the NPC converter. A third harmonic is mixed to a reference oscillation for the power electronics circuit. It is possible to avoid energy feedback from the floating cells, and the efficiency of the entire system is increased. The switching losses could thus be kept extremely low. A voltage source providing energy to the cells via a diode rectifier is present. A special control in order to keep the cells voltage constant is not necessary. The only constraint is to keep the energy flow positive, because of the diode rectifier.

Dierk Schröder ET AL: «Selbstgeführte Wechselrichter mit eingeprägter Spannung» In: «Leistungselektronische Schaltungen ADD. Funktion, Auslegung and Anwendung", 31 Jan. 2019, Springer, pages 604-724, describes control of converters, in which several control schemes are mentioned, such as optimized pulse patterns and pulse width modulation.

EP 3 142 236 A1 relates to converter control with optimized pulse patterns, where the optimized pulse patterns are adapted for minimizing a difference between a converter flux reference and a converter flux estimate.

BRIEF DESCRIPTION

Embodiments of the present disclosure provide means for enabling a stable operation of the power electronic converter device.

This is achieved by the subject-matter of the independent claims. Advantageous embodiments are given in the dependent claims, in the further description as well as in the figures, wherein the described embodiments can, alone or in any combination with the respective embodiments, provide a feature of the present disclosure unless not clearly excluded.

An aspect of the present disclosure relates to a method for operating a power electronic converter device for an electrical power conversion system.

The power electronic converter device includes a converter circuit including an input side with input terminals, which may be DC terminals, and an output side with at least one AC output terminal, such as three AC output terminals. The converter circuit includes a first and/or main converter with semiconductor devices, and the first converter is connected to the input terminals and provides at least one AC output (such as three AC outputs). The converter circuit furthermore includes at least one second converter connected between an AC output of the first converter and the respective AC output terminal. The converter circuit may include a second converter for each output phase. The or each second converter includes at least one floating cell or a series-connection of floating cells, wherein the or each floating cell includes a DC intermediate circuit and semiconductor devices. The DC intermediate circuit may also be called DC link and/or may include at least one capacitor.

The power electronic converter device furthermore may include a controller, which is configured for performing the method.

According to an embodiment of the present disclosure, the method includes: switching the semiconductor devices of the floating cell at switching instants determined with optimized pulse patterns or carrier-based pulse width modulation. The semiconductor devices of the first converter may also be switched in this way. It has to be noted that everything described with respect to a second converter with one floating cell also may refer to a second converter with a series connection of floating cells.

According to an embodiment of the present disclosure, the method further includes: determining a (desired) fundamental voltage component for the floating cell, which fundamental voltage component depends on a difference between an actual voltage $V_{C\_AF}$ of the DC intermediate circuit of the floating cell and a reference value $V_{C\_AF*}$ for the voltage of the DC intermediate circuit. The desired voltage component is used for balancing the floating cell, its DC intermediate circuit and in particular the capacitor there. The (desired) fundamental voltage component may be a signal, which is generated in the controller, for example by a PI controller or a hysteresis controller, such as will be described below. From this (desired) fundamental voltage component, modified switching instants are determined, which, when applied to the semiconductor devices of the floating cell, result in a (real) fundamental voltage component in the actual voltage generated by the floating cell.

According to an embodiment of the present disclosure, the method further includes: generating the fundamental voltage component in the actual voltage of the DC intermediate circuit of the floating cell by modifying the switching instants, such that a voltage $V_{C\_AF}$ of the DC intermediate circuit is lying in a given reference voltage range, in particular for balancing the DC intermediate circuit of the floating cell. The (desired) fundamental voltage component is input into a further controller part, which modifies the switching instants determined with optimized pulse patterns and/or carrier-based pulse width modulation According to an embodiment of the present disclosure, the fundamental voltage component is generated in the actual voltage of the floating cell, such that the respective voltage $V_{C\_AF}$ of the DC intermediate circuit is kept at a reference value $V_{C\_AF}^*$. In particular, the fundamental voltage component is zero when the DC intermediate circuit, and in particular the capacitor, of the floating cell is balanced and/or is at its reference value.

According to an embodiment of the present disclosure, the fundamental voltage component is generated by a PI controller, whose input is the difference between the actual voltage $V_{C\_AF}$ of the corresponding DC intermediate circuit and its reference value $V_{C\_AF}^*$. It is also possible that a hysteresis controller is used in such a way.

According to an embodiment of the present disclosure, a variable gain of the PI controller is adjusted in dependence of a fundamental component of a phase current flowing through the floating cell. The proportional variable gain of the PI controller may be multiplied with the inverse of the amplitude of a fundamental load current $\hat{i}L$.

According to an embodiment of the present disclosure, the fundamental voltage component has a phase angle relative to a fundamental component of a phase current flowing through the floating cell in a range of −85° . . . +85°, in particular, when charging of the cell is desired. When discharging is desired the angle is 95 to 265 degrees.

According to an embodiment of the present disclosure, the fundamental voltage component is in phase with said fundamental component of the phase current, in particular, when charging of the cell is desired. When discharging is desired the angle is 180 degrees.

According to an embodiment of the present disclosure, the method further includes: switching the semiconductor devices of the first converter at switching instants determined with optimized pulse patterns or carrier-based pulse width modulation; and generating and/or modifying a fundamental voltage component in a voltage, which is output by the first converter, by modifying the switching instants applied to the first converter, wherein the fundamental voltage component in the actual voltage, which is output by the first converter, is determined in dependence of the (desired) fundamental voltage component determined for the floating cell.

According to an embodiment of the present disclosure, the fundamental voltage component of the voltage at the first converter is generated and/or modified, such that the fundamental component of the voltage at the output terminals is kept constant.

According to an embodiment of the present disclosure, the fundamental voltage component generated by the floating cell is balanced and/or cancelled out by the fundamental voltage component generated by the first converter. In other words, their sum may be zero. In this way, the one or more floating cells may be balanced without changing an output of the overall system.

According to an embodiment of the present disclosure, the switching instants for the floating cell are modified by adjusting switching angles of the optimized pulse patterns. An adjustment of the switching angles of the semiconductor devices of the floating cell may be based on a sign of the corresponding switching transition. An adjustment of the switching angles of the semiconductor devices of the floating cell may be based on appropriate gains related to the nominal switching angles of the optimized pulse patterns.

According to an embodiment of the present disclosure, when the floating cell is switched with carrier-based pulse width modulation, the switching instants are modified by adding a sinusoidal signal at the fundamental frequency to a reference of carrier-based pulse width modulation.

According to an embodiment of the present disclosure, when both the first converter and the at least one floating cell are switched with optimized pulse patterns, the optimized pulse patterns of the first converter and the at least one floating cell are selected such that the weighted total harmonic distortion of the sum of the voltages of the DC intermediate circuit and the output voltage of the first converter is minimized.

A further embodiment of the present disclosure relates to a method for operating a converter device for an electrical power conversion system, the power electronic converter device including: (i) a converter circuit including an input side with input terminals, an output side with output terminals, a first converter with semiconductor devices and at least one second converter connected in series with the first converter, said second converter a floating cell with a DC intermediate circuit and semiconductor devices or a series connection of a plurality of floating cells each with a DC intermediate circuit and semiconductor devices, and (ii) a control device for driving the semiconductor devices of at least one of the converters via pulse-like signals. According to several embodiments of the present disclosure, the control device drives the semiconductor devices of the at least one floating cell by use of optimized pulse patterns (OPPs) and/or carrier-based pulse width modulation (CB-PWM) signals such that a respective voltage of the DC intermediate circuit or the DC intermediate circuits is/are lying in a given reference voltage range. By means of the floating cells a DC voltage can be added to or subtracted from a DC voltage of the first converter with the help of the semiconductor devices to generate a sufficiently harmonics-free desired output voltage and current. Basic prerequisite for stable operation are relatively similar voltages of the individual floating cells or their intermediate circuits. In the following, the voltage of the intermediate circuit is also referred to as the voltage of the floating cell.

According to an embodiment of the present disclosure, the control device drives the semiconductor devices such that the voltage(s) of the DC intermediate circuit(s) is/are kept at their reference value. This may be done by use of a balancing routine.

The pulse patterns of the two converters may be selected such that the total harmonic distortion (THD) of the sum of the voltages of the DC intermediate circuit(s) and the output voltage of the first converter is minimized. In some embodiments, the total harmonic distortion (THD) of the sum of the voltages of the DC intermediate circuit(s) and the output voltage of the first converter is weighted.

According to an embodiment of the present disclosure, each fundamental voltage component of the floating cells for the balancing has a phase angle relative to the fundamental component of the phase current in a range of −85° . . . +85° and may be in phase with said fundamental component of the phase current, in particular, when charging of the cell is required. For discharging an angle from 95° to 265°, including 180°, may be used.

According to an embodiment of the present disclosure, the fundamental component for the balancing is generated by a PI controller unit and/or a hysteresis controller unit, whose input is the difference between the (filtered) actual voltage of the corresponding DC intermediate circuits and its reference.

The fundamental component of the voltage at the first converter may be modified such that the total fundamental component of the voltage at the output terminals is kept constant.

According to an embodiment of the present disclosure, the converter device includes:
(ii) a converter circuit including an input side with input terminals, an output side with output terminals, a first converter with semiconductor devices and at least one second converter connected in series with the first converter, said second converter including a floating cell with a DC intermediate circuit and semiconductor devices or a series connection of a plurality of floating cells each with a DC intermediate circuit and semiconductor devices, and
(ii) a control device for driving the semiconductor devices (of at least one of the converters via pulse-like signals.

The control device may be arranged to drive the semiconductor devices of the at least one floating cell by use of OPPs and/or CB-PWM signals such that a respective voltage VC AF of the DC intermediate circuit or the DC intermediate circuits is/are lying in a given reference voltage range. By means of the floating cell(s) a DC voltage can be added to or subtracted from that of the first converter with the help of semiconductor devices to generate a sufficiently distortion-free desired output signal. The basic prerequisite for stable operation are relatively similar voltages of the individual cells or their intermediate circuits. In the following, the voltage of the intermediate circuit is also referred to as the voltage of the floating cell.

The embodiments mentioned in connection with the method for operating a power electronic converter device shall apply mutatis mutandis also to the corresponding power electronic converter device and vice versa.

According to an embodiment of the present disclosure, the control device is arranged to drive the semiconductor devices such that the voltage(s) of the floating cell(s) is/are kept at their reference value. This may be done by use of a balancing routine.

The pulse patterns of the two converters may be selected such that the weighted total harmonic distortion (THD) of the sum of the voltages of the DC intermediate circuit(s) and the output voltage of the first converter is minimized.

According to an embodiment of the converter device according to the present disclosure, for each floating cell a fundamental floating voltage component is in phase or 180 degrees out of phase with the corresponding phase current.

The power electronic-converter device, especially the controller of said converter device includes a controller unit, especially a PI controller unit, wherein the fundamental component for the balancing is generated by said controller unit, whose input is the difference between the actual voltage of the corresponding floating cells and the reference voltage.

According to an embodiment of the converter device according to the present disclosure, the fundamental component of the voltage at the first converter is modified such that the fundamental component of the voltage at the output terminals is kept constant.

A further aspect of the present disclosure relates to a computer program product including computer-executable program code portions having program code instructions configured to execute the method as described above and below, when loaded into a computer-based control device.

A further aspect of the present disclosure relates to a computer-readable medium, in which such a computer program product is stored.

A further aspect of the present disclosure relates to a power electronic converter device for an electrical power conversion system, the power electronic converter device including: a converter circuit including an input side with input terminals, an output side with at least one output terminal, a first converter with semiconductor devices connected to the input terminals and at least one second converter connected between an AC output of the first converter and the AC output terminal, said second converter including at least one floating cell with a DC intermediate circuit and semiconductor devices, and a control device for driving the semiconductor devices of the at least one floating cell and optionally of the first converter, wherein the control device is configured for performing the method as described above and below. Further features of the present disclosure are apparent from the claims, the figures and the description of the figures. All the features and feature combinations mentioned above in the description as well as the features and feature combinations mentioned below in the description of the figure and/or shown in the figure alone are usable not only in the respectively specified combination, but also in other combinations or alone.

Now, aspects of the present disclosure are explained in more detail based on embodiments as well as with reference to the attached drawings.

BRIEF DESCRIPTION OF DRAWINGS

These and other aspects of the present disclosure will be apparent from and elucidated with reference to the embodiments described hereinafter. Individual features disclosed in the embodiments can constitute alone or in combination an aspect of the present disclosure. Features of the different embodiments can be carried over from one embodiment to another embodiment.

In the drawings.

DETAILED DESCRIPTION

Figure 1:
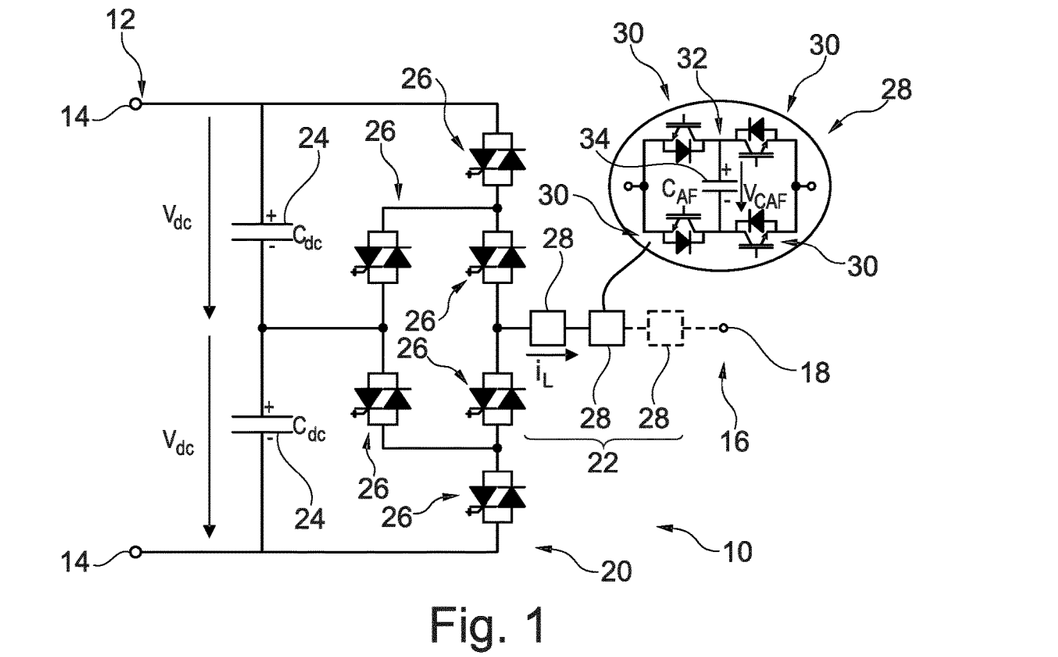
FIG. 1 shows a schematic diagram of a converter circuit with a first and a second converter of a power electronic converter device according to a first embodiment of the present disclosure.

FIG. 1 shows a schematic diagram of a converter circuit 10. The converter circuit 10 shows one-phase of a three-phase converter device, which includes an input side 12 with input terminals 14, an output side 16 with an output terminal 18, a first converter 20 and a second converter 22 connected in series with the first converter 20. The first converter 20 is a neutral-point clamped (NPC) converter or an active neutral-point clamped (ANPC) converter. It could be another type of three-level converter, a two level converter or a converter with more than three levels. The first (main) converter 20 includes capacitive elements 24 (depicted as capacitors) and semiconductor devices 26. The second converter 22 includes a series connection of a plurality of floating cells 28. These floating cells 28 function as active filters (AF) and are therefore also called "AF cells" or "H-bridge AF cells". Each floating cell 28 includes two pairs of semiconductor devices 30 and a DC intermediate circuit 32 with a capacitive element 34 (depicted as capacitor) interconnected between the two pairs of semiconductor devices 30. The capacitive element 34 has a capacitance $C_{AF}$ leading to a corresponding voltage $V_{C\ AF}$ at the DC intermediate circuit 32.

The basic AF control objective is to compensate the three phase (3L) (A)NPC output waveform harmonics while maintaining the average value of each AF cell capacitor voltage $V_{C\ AF}$ at its reference (AF balancing). The balancing control concept should also enable the use of the floating cells 28 as an add-on to existing converters. An additional control requirement is its suitability to modular concepts to ensure it can be easily adjusted to higher DC-link voltages and higher capacitor voltages as well as a higher number of floating cells 28.

Figure 2:
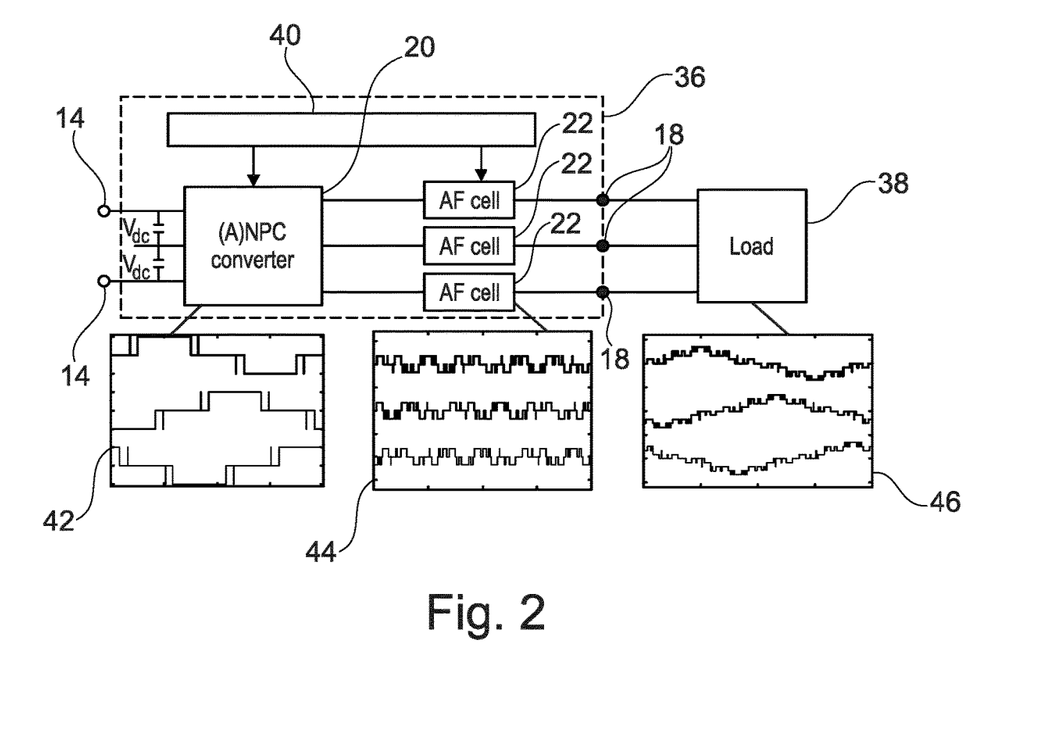
FIG. 2 shows a schematic diagram of a power electronic converter device according to a second embodiment of the present disclosure together with a three-phase load connected to the power electronic converter device.

FIG. 2 shows a power electronic converter device 36 according to a first embodiment and a load 38 connected to the output side 20 of the converter device 36. The converter device 36 includes the converter circuit 10 and a control device 40 for driving the semiconductor devices 26, 30 of at least one of the converters 20, 22 via pulse-like signals. The control device 40 drives the semiconductor devices 26, 30 by use of OPPs or CB-PWM such that a respective voltage $V_{C\ AF}$ of the DC intermediate circuits 32 is balanced, which means that it is lying in a given reference voltage range.

In the example the first converter 20 and the floating cells 28 are modulated by OPPs for a three-phase load 38. The steps of the switching transitions of the 3L(A)NPC are higher than the ones of the AF switching transitions. The pulse patterns of the two converters 20, 22 must be computed in such a way that the weighted total harmonic distortion (weighted THD) of the sum of the voltages 42, 44 of the first converter 20 and the cell(s) 28 of the second converter 22 is minimized. Other objective functions can also be considered. Furthermore, the fundamental voltage component must be generated only by the first converter 20 (the 3L(A)NPC converter), the fundamental voltage component of the floating cell(s) 28 is zero since it cannot provide active power. The resulting voltage 46 at the load 38 is depicted as a 3-phase voltage course.

The OPP-modulated floating cells 28 need a balancing mechanism that ensures that the average voltage of the capacitive element 34 (functioning as an intermediate floating capacitor) remains constant and close to its reference. The present disclosure proposes two balancing approaches.

Figure 3:
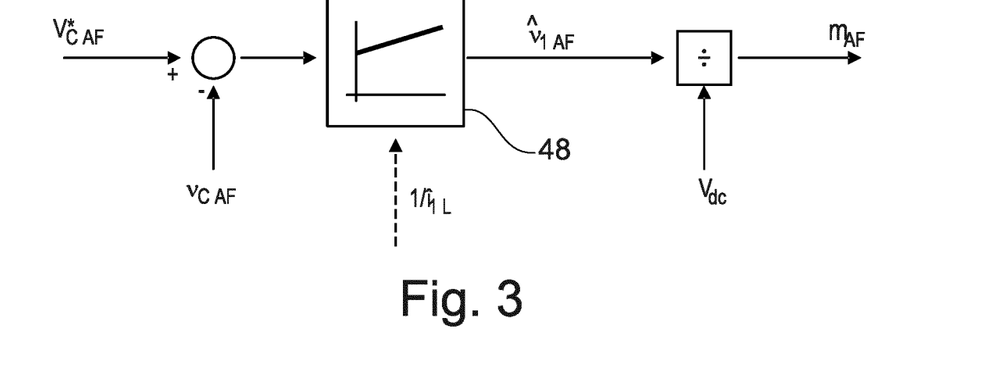
FIG. 3 shows a schematic schema of the generation of an AF balancing signal for one phase by use of a PI controller.

The approach is based on the injection of a fundamental AF voltage component which may be in phase with the load current, when charging is desired. For discharging the angle may be 180°. The necessary AF fundamental component for the balancing may be generated by a PI controller unit 48 whose input is the difference between the (filtered) actual voltage of the AF capacitor VC AF and the average value reference VC AF* as shown in FIG. 3. The proportional gain of the PI controller unit 48 can be multiplied with the inverse of the amplitude of the fundamental load current î L in order to keep the gain of the balancing loop constant and independent of the load current. For low currents the gain can be limited to certain values in order to avoid very big changes in the nominal switching angles. The output of the PI controller unit 48 gives the amplitude of the desired AF fundamental component v^1 for the corresponding floating cell 28. Each phase should have one such controller and the control of the AF capacitor voltage in each phase is independent of the other phases.

Figure 4:
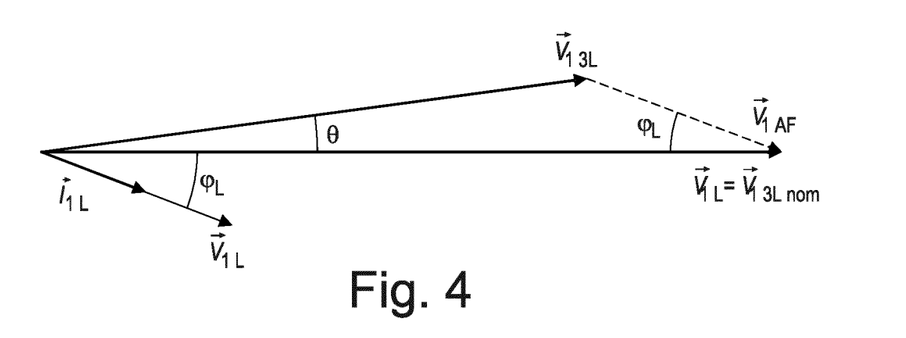
FIG. 4 shows phasors of fundamental voltage components of the phase voltage of the first converter of the three-phase converter.

Besides modifying the AF fundamental voltage component, the 3L(A)NPC fundamental component must be modified accordingly in order to keep the fundamental component of the voltage at the load terminals the same. The calculation of the desired fundamental 3L(A)NPC phase voltage component is carried out with the help of the phasors of the fundamental voltage components of the 3L(A)NPC and the AF as illustrated in FIG. 4. With the help of the phasor diagram the desired 3L(A)NPC phasor $\vec{V}_{1\ 3L}$ can be calculated from the fundamental component of the nominal OPP $\vec{V}_{1\ 3Lnom}$ for a given AF fundamental component phasor $\vec{V}_{1\ AF}$:

$$\vec{V}_{1\ 3L} = \vec{V}_{1\ 3Lnom} - \vec{V}_{1\ AF} = |\vec{V}_{1\ 3L}|. \qquad (1)$$

From the above equation we can calculate the amplitude $|\vec{V}_{1\ 3L}|$ and phase θ of the desired 3L(A)NPC fundamental component. From the former we can calculate the necessary change in the amplitude of the fundamental 3L(A)NPC voltage $$\Delta V_{NPC} = |\vec{V}_{1\ 3L}| - |\vec{V}_{1\ 3Lnom}|. \qquad (2)$$

The next sections describe how the nominal switching angles are modified in order to generate the necessary 3L(A)NPC and AF fundamental components in each phase.

By appropriately modifying the switching angles of the original 3L(A)NPC pulse pattern over 2π, $\alpha_{NPC\ i}$, where the index i refers to the $i^{th}$ switching transition $\Delta u_{NPC\ i}$, the desired 3L(A)NPC fundamental component can be generated. Different approaches can be used for this modification. In this specific implementation it is done in two steps, one to get the desired amplitude and one to get the desired phase:

1) In a first step the amplitude of the fundamental component is modified via addition of an angle ΔαNPCi to each 3L(A)NPC switching angle:

$$\Delta \alpha_{NPCi} = k \cdot s(\Delta u_{NPCi}) \cdot g_{NPC} \cdot \Delta m_{NPC}, \qquad (3)$$

where $$\Delta m_{NPC} = \Delta V_{NPC}/V_{dc}, k = \begin{cases} 1, \alpha_{NPC,i} \leq \pi \\ -1, \alpha_{NPC,i} > \pi \end{cases} \quad (4)$$

Figure 5:
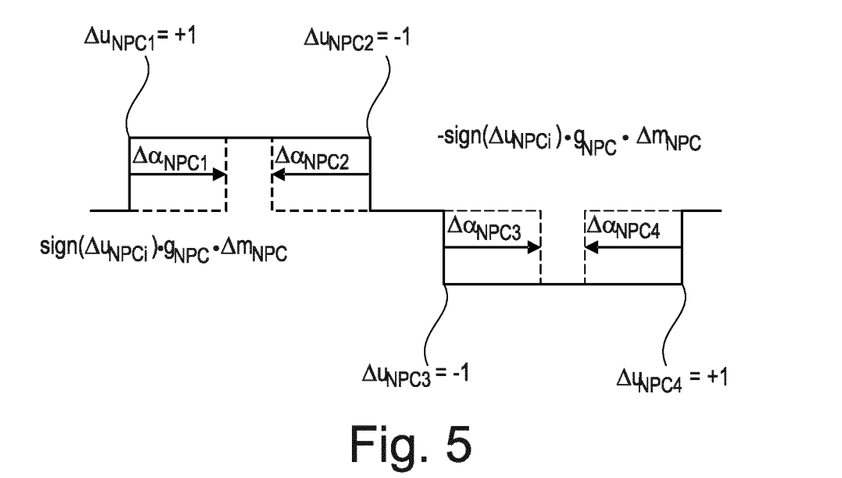
FIG. 5 shows modification of switching angles of the main converter in order to change the amplitude of the fundamental voltage component.

The total dc-link voltage of the first converter (especially 3L(A)NPC converter) 20 is 2Vdc, which is also visible in FIG. 2. The sign of k depends on the half period of the fundamental component of the nominal pulse pattern the switching angle lies in. This is exemplified in FIG. 5. The $g_{NPC} \cdot \Delta m_{NPC}$ part of equation (5) is independent of the actual nominal switching angle, which means that the absolute value of the change is the same for all switching angles, only the sign is switching angle dependent. The gain gNPC defines how big this change should be in order to achieve the desired change in the modulation index. When we have only one switching angle within a quarter wave period and the OPP has both half wave and quarter wave symmetry the necessary gain can be calculated analytically $$g_{NPC} = [\alpha_{NPC1\ nom} - a\cos(4/\pi \cdot |\vec{V}_{1\ 3L}|/)]/\Delta m_{NPC}. \quad (5)$$

For higher number of switching angles the gain $g_{NPC}$ is calculated as a function of the modulation index and stored in the OPP. It is calculated by changing the nominal 3L(A)NPC switching angles by $\Delta\alpha_{NPCi} = k \cdot \text{sign}(\Delta u_{NPCi}) \cdot \Delta_{NPC}$ and calculating the change $\Delta m_{NPC}$ that it causes to the modulation index of the 3L(A)NPC:

$$g_{NPC} = \Delta\alpha_{NPC}/\Delta m_{NPC}. \quad (6)$$

2) Subsequently, the previously calculated angle θ is added to each 3L(A)NPC nominal switching angle in order to obtain the desired phase of the 3L(A)NPC fundamental voltage. The modified 3L(A)NPC switching angles will then be:

$$\alpha_{NPCi} = \alpha_{NPCi\ nom} + \Delta\alpha_{NPCi} - \theta. \quad (7)$$

For a three phase load with a phase difference of ±2π/3 for phases b and c the modified 3L(A)NPC switching angles in each phase can be expressed as:

$$\left. \begin{array}{l} \alpha_{NPC,ia} = \alpha_{NPC,inom} - \theta + \Delta\alpha_{NPC,ia} \\ \alpha_{NPC,ib} = \alpha_{NPC,inom} - \theta - 2\pi/3 + \Delta\alpha_{NPC,ib} \\ \alpha_{NPC,ic} = \alpha_{NPC,inom} - \theta + 2\pi/3 + \Delta\alpha_{NPC,ic} \end{array} \right\} . \quad (8)$$

The desired AF modulation index can be achieved via small modifications of the original AF switching angles (for which the AF modulation index is zero) of the corresponding phase. Before these modifications are done, the angle θ defined previously is added to the nominal switching angles of the AF in order to avoid mismatches between the pulse patterns of the first and second converter 20, 22 (3L(A)NPC and the AF):

$$\alpha'_{AFi} = \alpha_{AFi\ nom} - \theta, \quad (9)$$

where αAFi nom is the $i^{th}$ nominal AF switching angle.

Different approaches can be the used for the injection of a fundamental component, for example a modification of the switching angles based on the following formula may be used:

$$\Delta\alpha_{AFi} = \Delta\alpha_{AFmax} \cdot \text{sign}(\Delta u_{AFi}) \cdot \sin(\alpha'_{AFi\ nom} + \varphi_{AF}). \quad (10)$$

where $\Delta u_{AFi}$ is the switching transition corresponding to the $i^{th}$ switching angle $\alpha_{AFi}$, and $\varphi_{AF}$ is the desired phase of the AF fundamental component. $\varphi_{AF}$ may be set equal to the phase difference between the fundamental components of the load voltage and the load current, which is denoted as $\varphi_L$ in FIG. 4. This way the injected AF voltage component is in phase with the load current and we can charge or discharge the AF capacitor more effectively.

For a desired AF modulation index $m_{AF}$ one must select the quantity $\Delta\alpha_{AFmax}$ accordingly. This is done by multiplying $m_{AF}$ with a gain, which is OPP-specific and approximately constant for relatively small changes of the nominal switching angles:

$$g_{AF} = \Delta\alpha_{AFmax}/m_{AF} \quad (11)$$

It can be precomputed for each pulse pattern as a function of $\varphi_{AF}$ and then stored with each OPP of the AF. Often, the influence of $\varphi_{AF}$ on the ratio $\Delta\alpha_{AFmax}/m_{AF}$ is negligible and it suffices to store one ratio for each AF pulse pattern (that corresponds to a specific modulation index of the main converter). If the influence of $\varphi_{AF}$ is not negligible, the ratio $\Delta\alpha_{AFmax}/m_{AF}$ as a function of $\varphi_{AF}$ must be computed stored.

The calculated angle difference $\Delta\alpha_{AFi}$ is added to $\alpha'_{AFi\ nom}$ in order to calculate the modified AF switching angle which is going to be used for the AF modulation $$\alpha_{AFi} = \alpha'_{AFi} + \Delta\alpha_{AF,i}. \quad (12)$$

By switching at the modified switching angles we generate the necessary AF fundamental component, which has both the desired amplitude $\hat{v}_{1\ AF}$ and phase $\varphi_{AF}$.

For a three phase load with a phase difference of ±2π/3 for phases b and c the AF switching angles modifications in each phase can be expressed as:

$$\left. \begin{array}{l} \alpha_{AF,ia} = \alpha_{AF,inom} - \theta + \Delta\alpha_{AF,ia} \\ \alpha_{AF,ib} = \alpha_{AF,inom} - \theta - 2\pi/3 + \Delta\alpha_{AF,ib} \\ \alpha_{AF,ic} = \alpha_{AF,inom} - \theta + 2\pi/3 + \Delta\alpha_{AF,ic} \end{array} \right\}, \quad (13)$$

Figure 6:
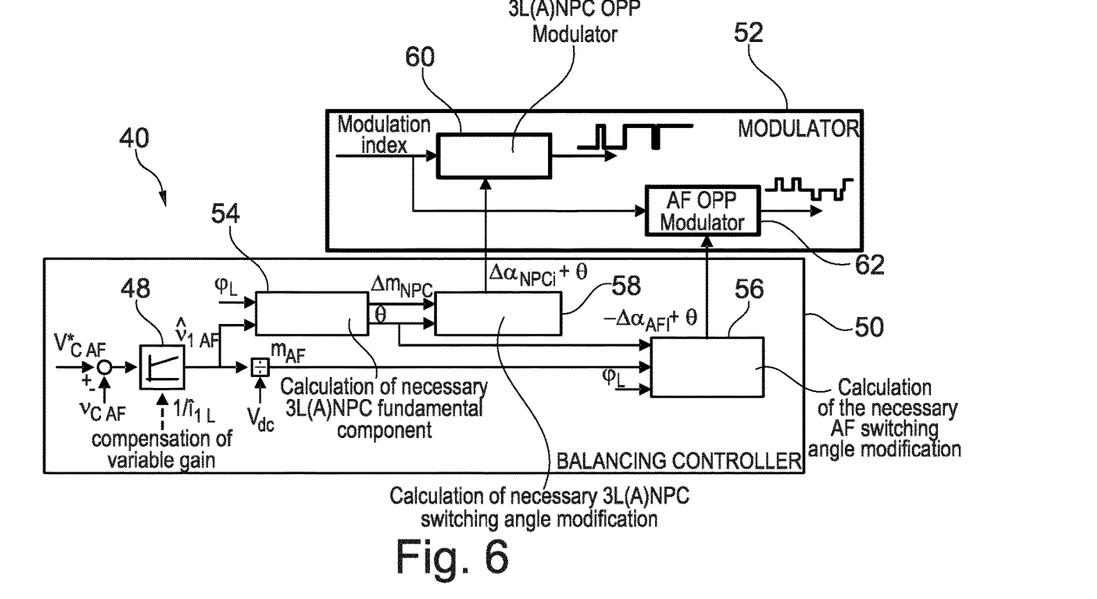
FIG. 6 shows a schematic diagram of the arrangement of the controller and a modulator modulating both converters by OPPs.

A simplified diagram of a balancing control unit 50 and an OPP modulator unit 52 is shown in FIG. 6. The control unit 50 should compensate only the average capacitor voltage and not the voltage ripple. This can be done by either filtering the measured capacitor voltage fed to the PI control unit 48 with a moving average filter over a suitably selected time window (e.g. half the fundamental period) or by appropriately selecting the bandwidth of the PI control unit 48. Module 54 represents the calculation of the necessary fundamental components of the first converter 20. When calculating the second converter 22 floating cell 28 switching angle changes (represented by module 56) and first converter 20 switching angle changes (represented by module 58) some restrictions have to be considered, which are not described in detail in this document. For example, the modified switching angle can't be higher than the next nominal switching angle. Constraints in the relation between the switching angles of different phases can be also considered if necessary. The calculated first converter switching angle changes are provided to a modulator module 60 for the first converter 20 and the calculated second converter switching angle changes are provided to a modulator module 62 for the second converter 22. Both modulator modules 60, 62 are OPP modulator modules in the example of FIG. 6.

In the above approach different fundamental components are considered for each phase, since the voltage of the capacitors of the floating cells can be a bit different in each phase. In a variation of the balancing approach the voltages of the capacitors of the floating cells of the different phases are brought to the same value with the help of a common mode (CM) component considered in the modulation of the floating cells. The CM component may be generated either via appropriate modification of the nominal switching angles of the floating cells in all three phases or by using the three-phase redundant switching vectors of the floating cells. In the former case an additional term $\Delta\alpha_{i,CM}$ is added to the AF switching angles, which is calculated by $$\Delta\alpha_{AF,i} = F_{max} \cdot CM \cdot \text{sign}(\Delta u_{AFi}) \cdot . \tag{14}$$

As previously for the fundamental component, for a desired CM component $m_{AF, CM}$ one must select the quantity $\Delta\alpha_{AFmax\ CM}$ accordingly. This is done by multiplying $m_{AF}$, CM with a gain, which is OPP-specific and approximately constant for relatively small changes of the nominal switching angles:

$$g_{AF,CM} = \Delta\alpha_{AFmax\ CM} / m_{AF,CM} \tag{15}$$

The term calculated by (14) is added to the term considered in (10), so that the total modification of the switching angles of the floating cells is given by $$\Delta\alpha_{AFi} = \Delta\alpha_{AFmax\ CM} \cdot \text{sign}(\Delta u_{AFi}) + \Delta\alpha_{AFmax} \cdot \text{sign}(\Delta u_{AFi}) \cdot \sin(\alpha'_{AFi\ nom} + \varphi_{AF}). \tag{16}$$

If redundant vectors are used alternative combinations of the switching states are considered that generate the same differential voltage but different CM voltage. For example instead of the combination $[u_{AFi,a}, u_{AFi,b}, u_{AFi,c}] = [1, 1, 0]$ one can select $[u_{AFi,a}, u_{AFi,b}, u_{AFi,c}] = [0, 0, -1]$. The difference between two phases remains the same, but the sum of the three phases is different. The selection of a redundant vector or not is based on the prediction of the evolution of the capacitor voltages after one sampling interval in the three phases using the capacitor transfer function and the measured phase current.

However, the use of redundant vectors will increase the switching frequency of the semiconductors of the floating cells. The switching frequency can be optimized by selecting a suitably long horizon (more than one sampling interval) and include penalization of the number of the necessary switching actions that take place when selecting redundant vectors which will bring the three capacitor voltages close to each other in the considered horizon. The (equal) voltage of the capacitors of the three phases is then brought to the desired reference value by the switching angle modifications described in (3)-(13). Since the voltages in each phase are considered equal the necessary fundamental components for the main converter and the floating cells (shown by phasors in FIG. 4) are the same for all three phases. Only a phase displacement of $-2\pi/3$ and $+2\pi/3$ compared to phase a will be present in phases b and c respectively.

A special case that must be carefully treated is when one or more switching angles of the main converter are the same with one or more switching angles of the floating cells. Then only the remaining AF switching angles (which are not the same with any switching angles of the main converter) are used for the generation of the fundamental component of the floating cells. Furthermore, in such a case the modification of the switching angles of the main converter generates a fundamental component also in the floating cells. This must be compensated with the afore mentioned remaining switching angles of the floating cells. The AF fundamental voltage component generated by the modification of the switching angles of the main converter is given by $$\vec{v}_{DM,injected} = -2 \cdot r_{AF} \cdot \Delta m_{NPC}, \quad \vec{v}_{Dm,injected} = 0, \tag{17}$$

where $r_{AF}$ is the ratio between the voltage of the floating cell and half the dc-link voltage of the main converter. The compensation term for the remaining switching angles of the floating cells is then calculated by:

$$\Delta\alpha_{AF,i,DM,comp} = 2 \cdot r_{AF} \cdot \Delta m_{NPC} \cdot g_{AF} \cdot \text{sign}(\Delta u_{AF,i}) \cdot \sin(\alpha_{AF,i} - \theta) \cdot \tag{18}$$

The same principle applies when the switching angles of the main converter are modified to balance the neutral point, e.g. when the main converter is a 3L(A)NPC. The CM component that will appear in the floating cells due to some simultaneous switchings with the main converter must be compensated by the remaining switching angles of the floating cells.

Figure 7:
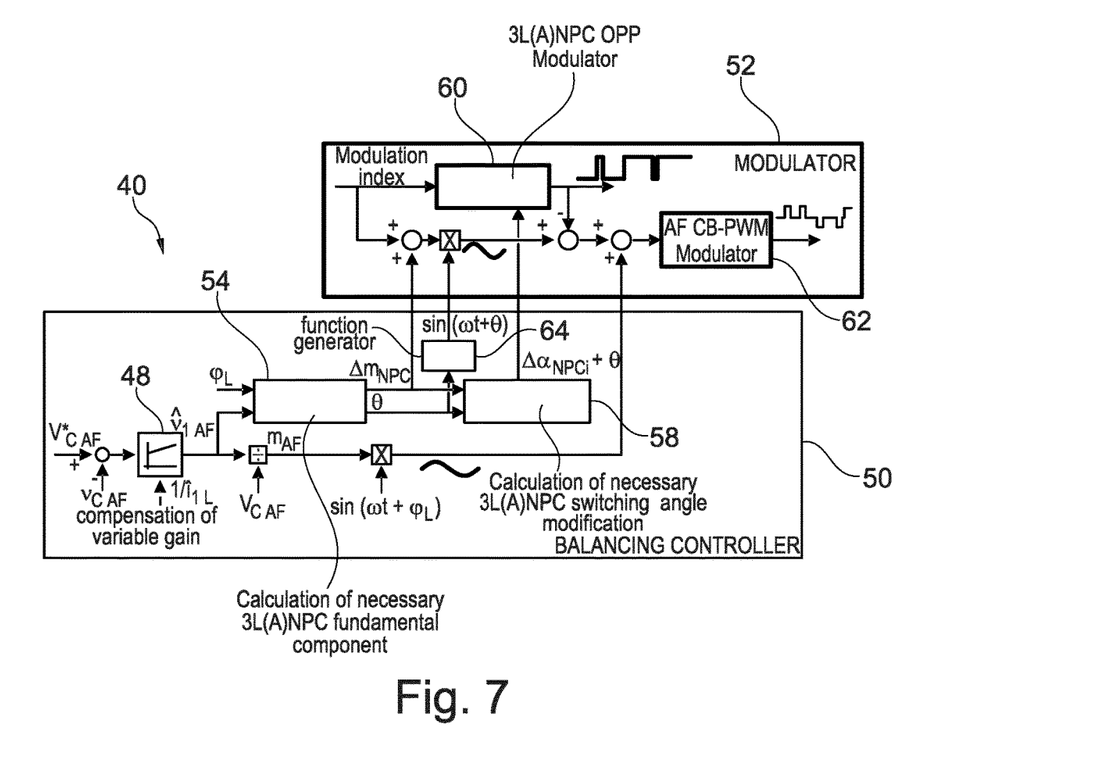
FIG. 7 shows a schematic diagram of the arrangement of controller and modulator modulating the first converter by OPPs and the second converter by CB-PWM.

If CB-PWM is used for the H-bridge cell(s) 28, the previously discussed modifications are applied only to the switching angles of the first converter 20 (modules 54, 58, 60). The necessary modifications of the AF switching instants are made by simply adding a suitable sinusoidal signal (generated by function generator 64) at the fundamental frequency to the CB-PWM reference of the AF (provided to corresponding modulator module 62). The amplitude of this signal is equal to $\hat{v}_{1\ AF}$ divided by the AF voltage and its phase may be equal to the phase of the load current $\varphi_L$ as shown in FIG. 7. In this case the nominal switching instants of the AF are computed by comparing a reference signal equal to the difference between the 3L(A)NPC reference signal and the 3L(A)NPC output switching states with the carrier signals. The above mentioned "nominal" reference signal is in essence equal to the sum of the 3L(A)NPC output voltage harmonics.

Figure 8:
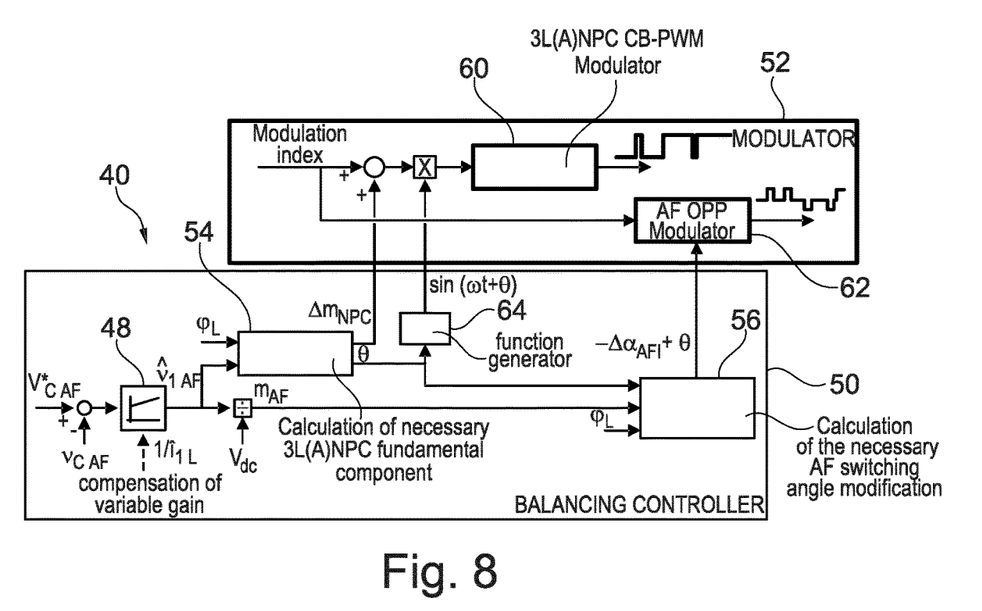
FIG. 8 shows a schematic diagram of the arrangement of controller and modulator modulating the first converter by CB-PWM and the second converter by OPPs.

If CB-PWM is used for the first converter 20, the previously discussed modifications are applied only to the switching angles of the AF. The necessary modifications of the 3L(A)NPC switching instants are made by suitably modifying its CB-PWM reference as shown in FIG. 8. The amplitude of the sinusoidal reference is equal to mNPC nom+ΔmNPC and its phase equal to θ. CM components can also be added to this sinusoidal reference if it is desirable. The proposed balancing schemes facilitate the balancing of the AF cell capacitor voltages when the AF cells and/or the main converter are modulated by OPPs. With OPP modulation we can achieve, in many cases, an improved output voltage quality compared to CB-PWM or other modulation approaches.

The control algorithm can be implemented on any computational hardware including DSPs, FPGAs, microcontrollers, CPUs, GPUs, multi-core platforms, and combinations thereof.

In the present disclosure, the first converter 20 is a 3L(A)NPC converter, but the same methods can be applied to other types of three-level converters, including neutral point piloted 3L converter. Embodiments of the present disclosure can also be applied to main converters with two levels or to main converters with more than three levels.

In the following, important aspects of the implementation of the method will be presented once again in other words:
1. the second converter 22 includes one or more auxiliary cells 28;
2. the modulation of the first converter 20 and of the second converter 22 is based on OPPs, or the modulation of only the first converter 20 is based on OPPs and CB-PWM is employed for the second converter 22, or the modulation of only the second converter 22 is based on OPPs and CB-PWM is used for the first converter 20;
3. the OPPs are pre-computed and stored in look-up tables;

4. the entries in the look-up tables contain the switching angles and the corresponding first or second converter switching states as a function of the modulation index and the pulse number;
5. the second converter 22 outputs a voltage that is used to optimize the waveform of the sum of the generated voltages of the first and the second converter 20, 22 with respect to different objective functions;
6. the computation of the above mentioned OPPs can be computed for different objective functions and performance trade-offs. For example, different OPPs could provide different behaviors of the harmonic distortion of the phase current, the common-mode voltage at the output and the floating capacitor voltage ripple;
7. there is a means to detect or to estimate the voltage of the capacitive H-bridge element (floating capacitor) 34 of the second converter 22;
8. the average voltage of the floating capacitor 34 is kept to its reference value by modifying the nominal switching angles of the first and second converter 22 stored in look-up tables or by modifying the nominal switching angles of the first converter and the reference signal of the second converter if CB-PWM is used for the second converter 22 or by modifying the reference signal of the first converter 20 and the nominal switching angles of the second converter if CB-PWM is used for the first converter;
9. the change of the switching angles is based on manipulative quantities that may correspond to the amplitude of the fundamental voltage components of the first and the second converter 20, 22;
10. the manipulative quantities may be generated by a PI control unit 48', a hysteresis controller 70, or a combination of both. The input of the controller 48', 70 is the deviation of the capacitor voltage from its reference value;
11. the amplitude of the load current value can also be an input to the PI control unit 48' so that the switching angle modifications are adjusted based also on it;
12. the change of the switching angles is subject to restrictions related to the next and previous switching angles in one phase and possibly to the next and previous switching angles in other phases; and
13. the capacitor voltage ripple of the second converter 22 is taken into account either by suitable hysteresis bounds for the hysteresis controllers 70 or by filtering the measured voltage with a moving average filter over a suitably selected time window (e.g. half the fundamental period) for the PI control units or by suitably adjusting the bandwidth of the PI control units 48'.

The invention claimed is:

1. A method for operating a power electronic converter device for an electrical power conversion system, the power electronic converter device comprising a converter circuit including an input side with input terminals, an output side with at least one AC output terminal, a first converter with semiconductor devices connected to the input terminals and at least one second converter connected between an AC output of the first converter and the AC output terminal, the at least one second converter comprising at least one floating cell with a DC intermediate circuit and semiconductor devices, the method comprising:
 switching the semiconductor devices of the at least one floating cell at switching instants determined with optimized pulse patterns or carrier-based pulse width modulation;
 determining a fundamental voltage component for the at least one floating cell, wherein the fundamental voltage component depends on a difference between an actual voltage $V_{C\_AF}$ of the DC intermediate circuit of the at least one floating cell and a reference value $V_{C\_AF*}$ for a voltage of the DC intermediate circuit;
 generating the fundamental voltage component in the actual voltage of the DC intermediate circuit of the at least one floating cell by modifying the switching instants, such that the actual voltage $V_{C\_AF}$ of the DC intermediate circuit is in a given reference voltage range;
 switching the semiconductor devices of the first converter at switching instants determined with optimized pulse patterns or carrier-based pulse width modulation; and
 generating a fundamental voltage component in a voltage output by the first converter by modifying the switching instants applied to the first converter, wherein the fundamental voltage component in the voltage output by the first converter is determined based on the fundamental voltage component determined for the at least one floating cell,
 wherein the fundamental voltage component of the voltage output by the first converter is modified, such that a fundamental component of a voltage at the at least one AC output terminal is kept constant; and/or wherein the fundamental voltage component of the at least one floating cell generated by the at least one floating cell is canceled out by the fundamental voltage component of the voltage output by the first converter.

2. The method according to claim 1, wherein the fundamental voltage component of the at least one floating cell is generated in the actual voltage of the at least one floating cell, such that the actual voltage $V_{C\_AF}$ of the DC intermediate circuit is kept at the reference value $V_{C\_AF*}$.

3. The method according to claim 1, wherein the fundamental voltage component of the at least one floating cell is zero when the DC intermediate circuit of the at least one floating cell is at the reference value $V_{C\_AF*}$.

4. The method according to claim 1, wherein the fundamental voltage component of the at least one floating cell is generated by a PI controller, whose input is the difference between the actual voltage $V_{C\_AF}$ of the DC intermediate circuit and the reference value $V_{C\_AF*}$.

5. The method of claim 4, wherein a variable gain of the PI controller is adjusted based on a fundamental component of a phase current flowing through the at least one floating cell.

6. The method according to claim 1, wherein the fundamental voltage component of the at least one floating cell has a phase angle relative to a fundamental component of a phase current flowing through the at least one floating cell in a range of −85° to +85° when charging the at least one floating cell and of 95° to 265° when discharging the at least one floating cell.

7. The method according to claim 6, wherein the fundamental voltage component of the at least one floating cell is in phase with the fundamental component of the phase current when charging the at least one floating cell; and wherein the fundamental voltage component of the at least one floating cell has a phase difference of 180° from the fundamental component of the phase current when discharging the at least one floating cell.

8. The method according to claim 1, wherein the switching instants of the at least one floating cell are modified by adjusting switching angles of the optimized pulse patterns; wherein an adjustment of the switching angles of the semiconductor devices of the at least one floating cell is based on a sign of a corresponding switching transition; and/or wherein an adjustment of the switching angles of the semiconductor devices of the at least one floating cell is based on gains related to nominal switching angles of the optimized pulse patterns.

9. The method according to claim 1, wherein, when the at least one floating cell is switched with carrier-based pulse width modulation, the switching instants of the at least one floating cell are modified by adding a sinusoidal signal at a fundamental frequency to a reference of the carrier-based pulse width modulation.

10. The method according to claim 1, wherein, when both the first converter and the at least one floating cell are switched with optimized pulse patterns, the optimized pulse patterns of the first converter and the at least one floating cell are selected such that a weighted total harmonic distortion of a sum of the voltages of the DC intermediate circuit and the voltage output by the first converter is minimized.

11. A non-transitory computer program comprising computer-executable program code portions having program code instructions loaded into a computer-based control device, wherein the non-transitory computer program is configured to operate a power electronic converter device for an electrical power conversion system, the power electronic converter device comprising a converter circuit including an input side with input terminals, an output side with at least one AC output terminal, a first converter with semiconductor devices connected to the input terminals and at least one second converter connected between an AC output of the first converter and the AC output terminal, the at least one second converter comprising at least one floating cell with a DC intermediate circuit and semiconductor devices, the non-transitory computer program further configured to:
  switch the semiconductor devices of the at least one floating cell at switching instants determined with optimized pulse patterns or carrier-based pulse width modulation;
  determine a fundamental voltage component for the at least one floating cell, wherein the fundamental voltage component depends on a difference between an actual voltage $V_{C\_AF}$ of the DC intermediate circuit of the at least one floating cell and a reference value $V_{C\_AF*}$ for a voltage of the DC intermediate circuit;
  generate the fundamental voltage component in the actual voltage of the DC intermediate circuit of the at least one floating cell by modifying the switching instants, such that the actual voltage $V_{C\_AF}$ of the DC intermediate circuit is in a given reference voltage range;
  switch the semiconductor devices of the first converter at switching instants determined with optimized pulse patterns or carrier-based pulse width modulation; and
  generate a fundamental voltage component in a voltage output by the first converter by modifying the switching instants applied to the first converter, wherein the fundamental voltage component in the voltage output by the first converter is determined based on the fundamental voltage component determined for the at least one floating cell,
  wherein the fundamental voltage component of the voltage output by the first converter is modified, such that a fundamental component of a voltage at the at least one AC output terminal is kept constant; and/or wherein the fundamental voltage component of the at least one floating cell generated by the at least one floating cell is canceled out by the fundamental voltage component of the voltage output by the first converter.

12. The non-transitory computer program of claim 11, wherein the non-transitory computer program is stored on a non-transitory computer-readable storage medium.

13. A power electronic converter device for an electrical power conversion system, the power electronic converter device comprising: a converter circuit including an input side with input terminals, an output side with at least one AC output terminal, a first converter with semiconductor devices connected to the input terminals and at least one second converter connected between an AC output of the first converter and an AC output terminal, the at least one second converter comprising at least one floating cell with a DC intermediate circuit and semiconductor devices; and a control device for driving the semiconductor devices of the at least one floating cell, wherein the control device is configured to:
  switch the semiconductor devices of the at least one floating cell at switching instants determined with optimized pulse patterns or carrier-based pulse width modulation;
  determine a fundamental voltage component for the at least one floating cell, wherein the fundamental voltage component depends on a difference between an actual voltage $V_{C\_AF}$ of the DC intermediate circuit of the at least one floating cell and a reference value $V_{C\_AF*}$ for a voltage of the DC intermediate circuit;
  generate the fundamental voltage component in the actual voltage of the DC intermediate circuit of the at least one floating cell by modifying the switching instants, such that the actual voltage $V_{C\_AF}$ of the DC intermediate circuit is in a given reference voltage range;
  switch the semiconductor devices of the first converter at switching instants determined with optimized pulse patterns or carrier-based pulse width modulation; and
  generate a fundamental voltage component in a voltage output by the first converter by modifying the switching instants applied to the first converter, wherein the fundamental voltage component in the voltage output by the first converter is determined based on the fundamental voltage component determined for the at least one floating cell,
  wherein the fundamental voltage component of the voltage output by the first converter is modified, such that a fundamental component of a voltage at the at least one AC output terminal is kept constant; and/or wherein the fundamental voltage component of the at least one floating cell generated by the at least one floating cell is canceled out by the fundamental voltage component of the voltage output by the first converter.

* * * * *